United States Patent [19]

Yamamoto

[11] 4,378,593
[45] Mar. 29, 1983

[54] TIME BASE CONVERSION APPARATUS

[75] Inventor: Kaichi Yamamoto, Zama, Japan

[73] Assignee: Sony Corporation, Tokyo, Japan

[21] Appl. No.: 200,006

[22] Filed: Oct. 23, 1980

[30] Foreign Application Priority Data

Oct. 26, 1979 [JP] Japan .................. 54-138883

[51] Int. Cl.³ .............................................. G06F 3/00
[52] U.S. Cl. ................................................... 364/900
[58] Field of Search ... 364/200 MS File, 900 MS File

[56] References Cited

U.S. PATENT DOCUMENTS

| | | | |
|---|---|---|---|
| 3,403,383 | 9/1968 | Kienzle .................. | 364/200 |
| 3,516,074 | 6/1970 | Enomoto et al. ......... | 364/200 |
| 4,016,548 | 4/1977 | Law et al. .............. | 364/200 |
| 4,028,667 | 6/1977 | Breslau et al. .......... | 364/200 |
| 4,218,754 | 8/1980 | Schaeffer ............... | 364/900 |
| 4,247,910 | 1/1981 | Cornell et al. ........... | 364/900 |

*Primary Examiner*—Harvey E. Springborn
*Attorney, Agent, or Firm*—Lewis H. Eslinger; Alvin Sinderbrand

[57] ABSTRACT

A time base converter for compressing or expanding the time base of an input digital signal comprises a data input terminal; a digital output circuit; a number n of memory banks for storing the input digital signal which is written therein at a write clock frequency and read out therefrom at a read clock frequency, and having a memory cycle with a writing phase and a reading phase in each period thereof and which is synchronized with the read clock, with the write clock frequency and the read clock frequency being different from one another; a number M of input latches in series between the data input terminal and each respective memory bank for gating to the latter a group of data words of the input digital signal in parallel, each input latch having a number N of channels, each channel processing a predetermined subgroup of the group of words; and an output latching circuit to couple the memory banks to the output circuit. In order to prevent loss of the input digital signal when the read clock frequency is lower than the write clock frequency, n, N, and M are selected to be appropriate positive integers, preferably to satisfy the inequality $$\frac{5N-4}{2(nM-1)\cdot N} < \frac{T_W}{T_R},$$

where $T_W$ and $T_R$ are the periods corresponding respectively to the write clock frequency and the read clock frequency.

11 Claims, 74 Drawing Figures

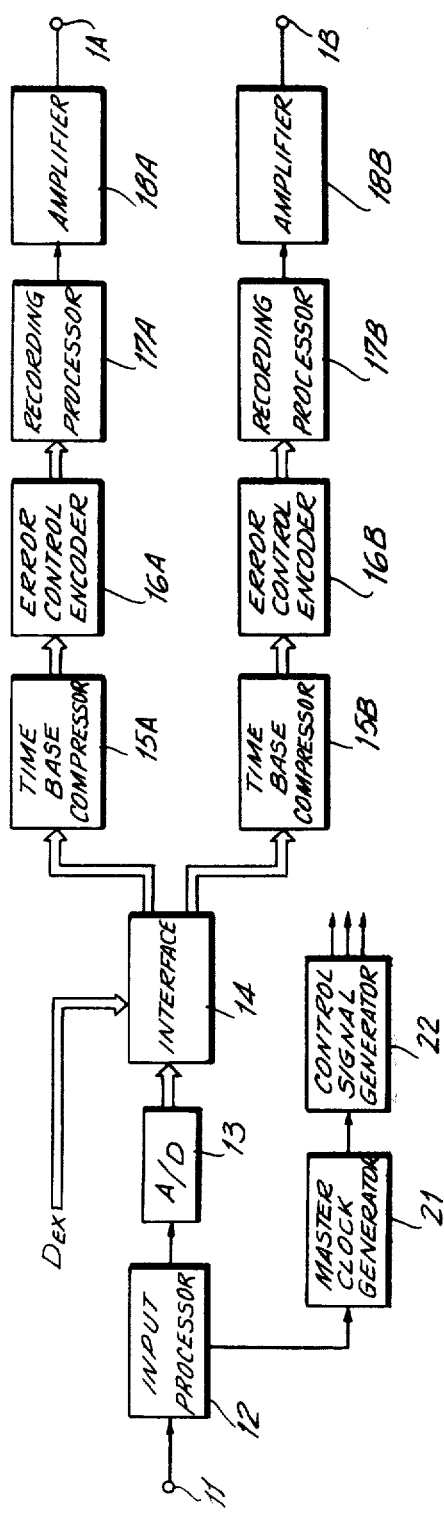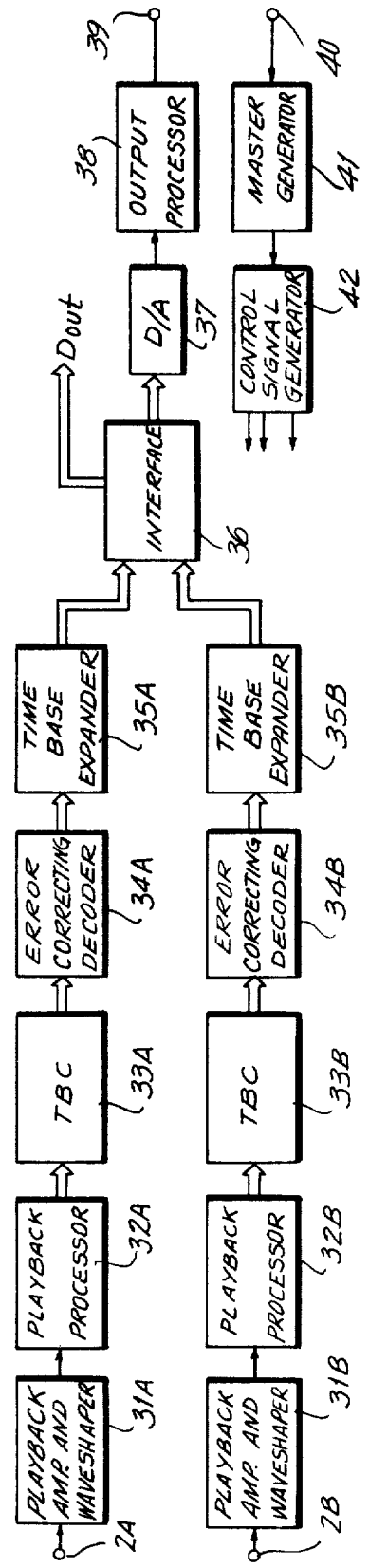

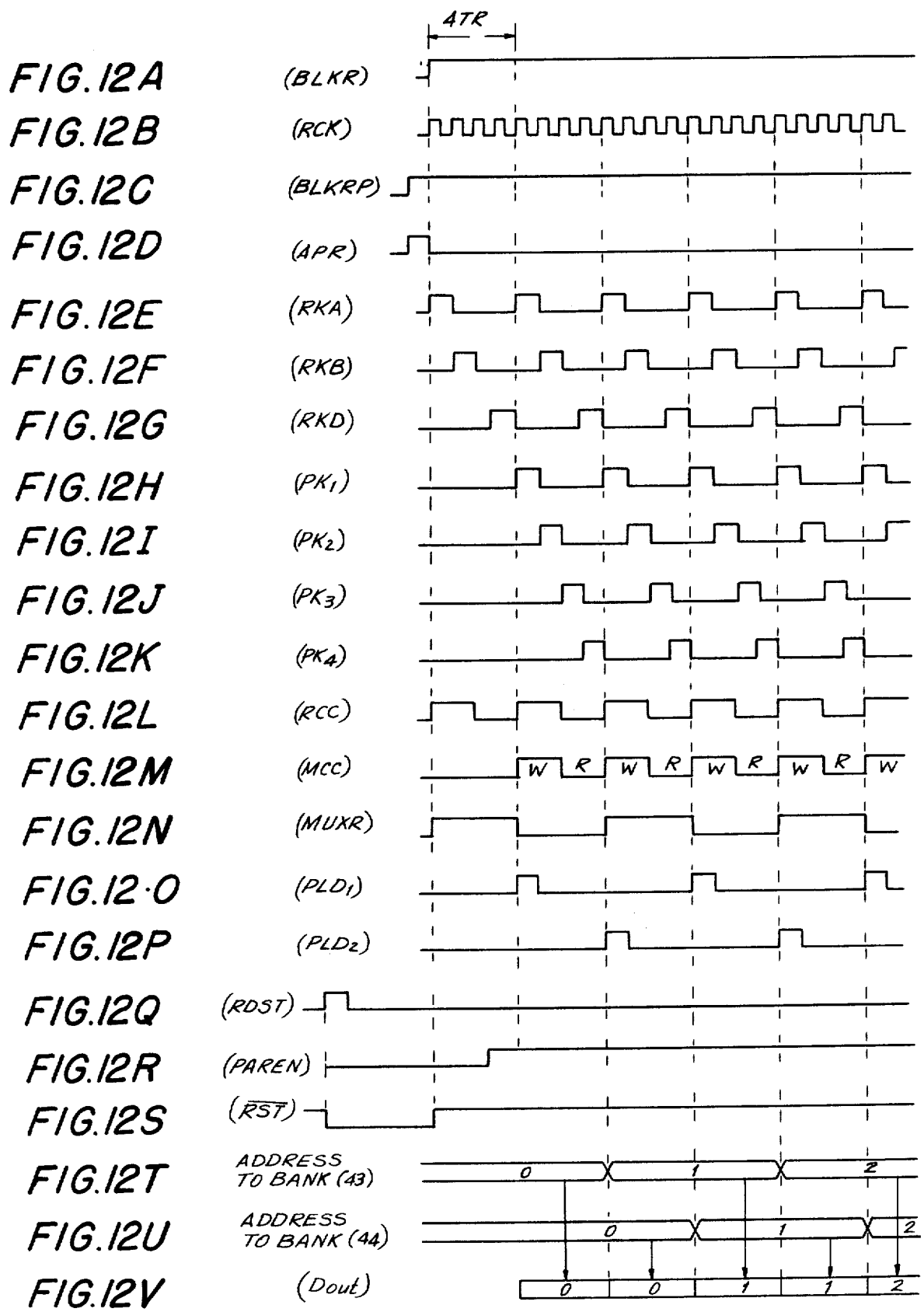

FIG.13A (BLKR) 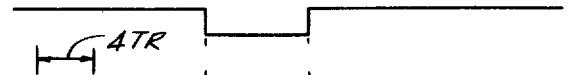
FIG.13B (RCC) 
FIG.13C (MCC) 
FIG.13D (BLKW) 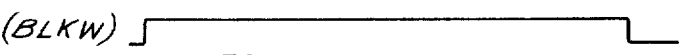
FIG.13E (WCC) 
FIG.14
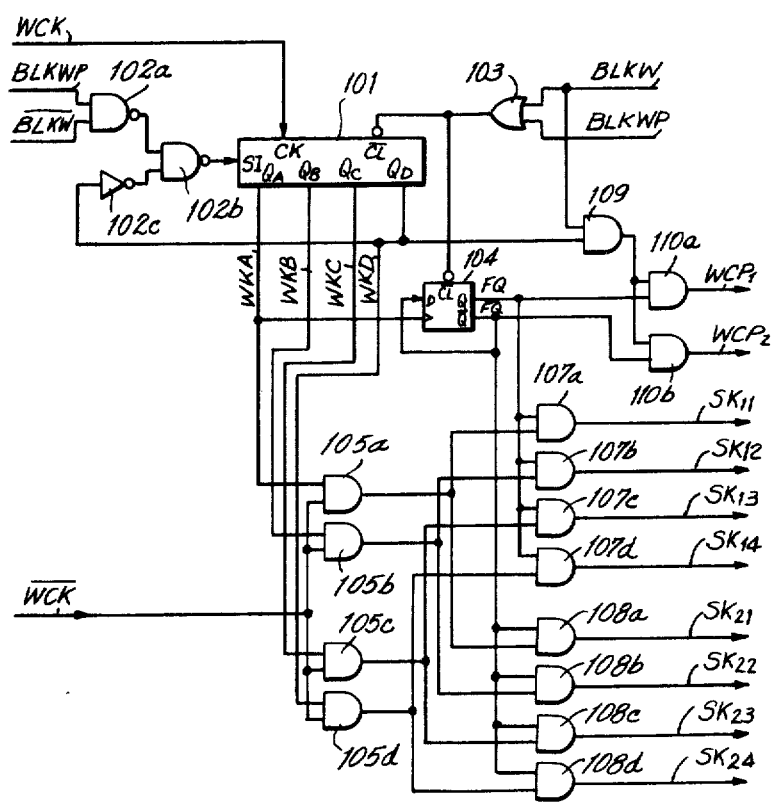

FIG. 15A (Din) 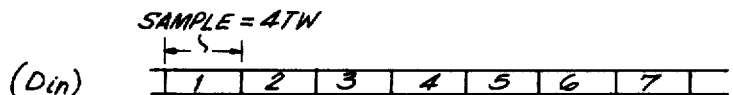
FIG. 15B (BLKW) 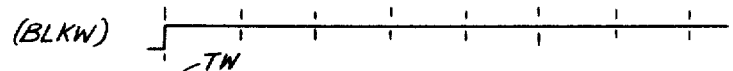
FIG. 15C (WCK) 
FIG. 15D (WKA) 
FIG. 15E (WKB) 
FIG. 15F (WKC) 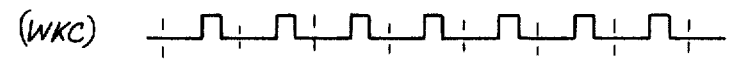
FIG. 15G (WKD) 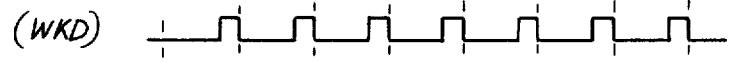
FIG. 15H (FQ) 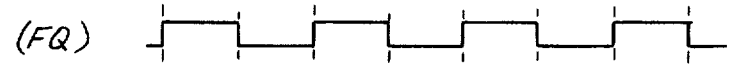
FIG. 15I (SK$_{11}$) 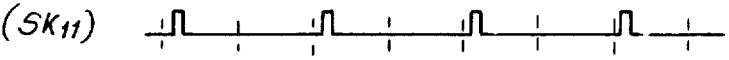
FIG. 15J (SK$_{12}$) 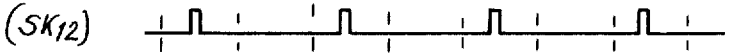
FIG. 15K (SK$_{13}$) 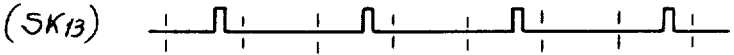
FIG. 15L (SK$_{14}$) 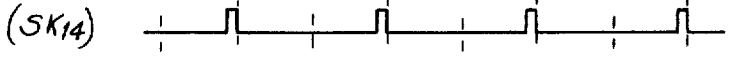
FIG. 15N (WCP$_1$) 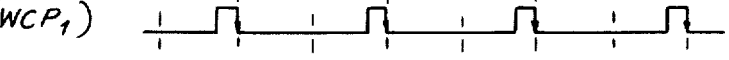
FIG. 15O (SK$_{21}$) 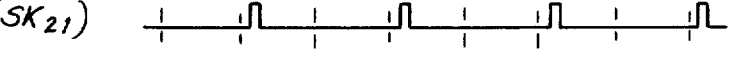
FIG. 15Q (SK$_{22}$) 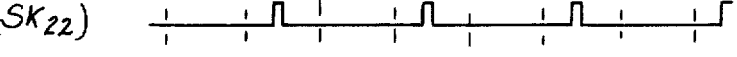
FIG. 15R (SK$_{23}$) 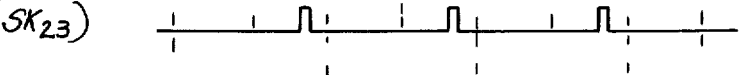
FIG. 15S (SK$_{24}$) 
FIG. 15U (WCP$_2$) 

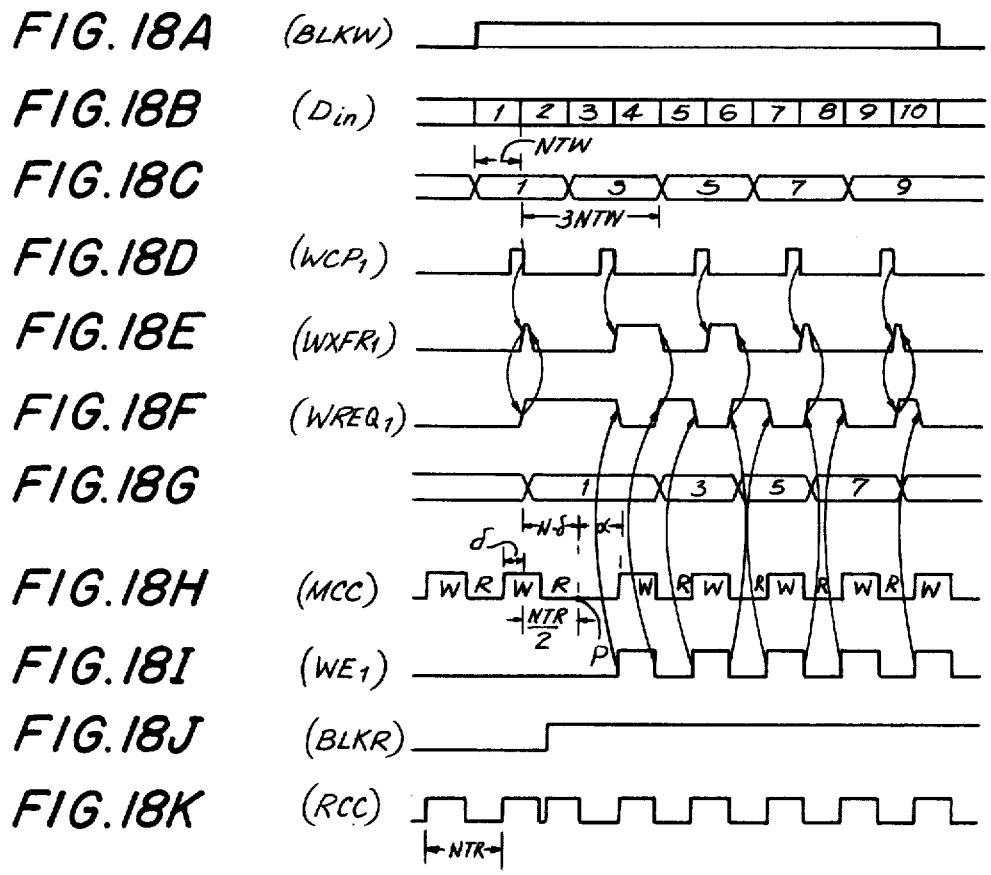
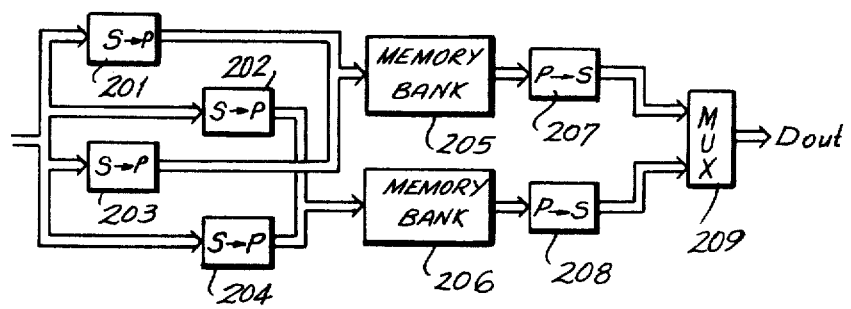

TIME BASE CONVERSION APPARATUS

BACKGROUND OF THE INVENTION

1. Field of the Invention

The present invention relates to time base conversion apparatus, and more particularly relates to apparatus suitable for converting the time base of a digitized video signal.

2. Description of the Prior Art

It is known to use a video recording and reproducing apparatus to record and to play back an analog signal, such as an audio signal, which is converted into a digital signal. For this purpose, a so-called audio pulse-code-modulation (PCM) recorder is used for converting the analog audio signal to a PCM signal for recording by means of a video tape recorder (VTR) and for converting the digital signal played back from the VTR to analog form.

In the PCM device mentioned above, a time base converter is included to compress the time base of the digital signal so that synthetic synchronizing signals like those that normally accompany a video signal can be included therein prior to recording on the VTR. The time base converter also functions to expand the time base of the played back digital signal to restore the digital audio signal to its original form. For compressing the time base of the digital signal, data is written into a memory or memories at a low-speed clocking rate and is read out therefrom at a high-speed clocking rate. In a complementary fashion, for expanding the time base of the digital signal, the latter signal is written into the memory or memories at a high-frequency clocking rate, but is read out therefrom at a low-frequency clocking rate.

Accordingly, because the clocking rate used for writing into the memory is different from that used for reading out therefrom, the writing and reading operations are asynchronous with one another. For this reason, even though there may be no memory access request for reading out, a memory access request for writing in can take place. Particularly, in the case of time base expanding, the writing operation can overtake the reading operation, with the result that two or more sets of input data are overwritten in the same memory location, and the information to be written into the memory is lost.

Such time base compressing and expanding is also required in a so-called digital video tape recorder (DVTR) in which a video signal is digitized for recording and playback. In the case of a DVTR, a conversion of the signal format is carried out following the compression of the time base of the digital video signal prior to recording, and upon playback of the digitized video signal prior to expansion of the time base thereof. In the DVTR, compression and expansion are carried out even during the blanking portions between adjacent groups of data. Because these data groups in the reproduced digital video signal occur even during blanking portions which, in the analog video signal, do not provide picture information, but rather are normally associated with a synchronizing signal and a burst signal, the writing operation requires that memory access requests take place very often. As a result, the aforementioned overwriting problem can become quite troublesome in the reproducing of the digitized video signal.

Furthermore, a random access memory (RAM) is normally used as the memory for a time base converting apparatus. However, in the RAM the cycle time, that is the time required for a reading and/or writing operation, is generally long. As a result, if a reproduced digital video signal is processed in the RAM, delays between memory access requests are likely to occur. In other words, when the transmission rate of the reproduced digital video signal is fast, a second group of bits of the digital video signal is quite often reached before the next prior group of bits has been written into the RAM, with the result either that one of these groups of bits will be lost altogether, or that the one group of bits will be written over the next prior group of bits, thereby destroying the information from both groups.

OBJECTS AND SUMMARY OF THE INVENTION

It is an object of this invention to provide a time base conversion apparatus in which input data is reliably written into and retrieved from a memory device, and, as a result, the digital information is not lost because of a time-base compressing or expanding operation.

It is another object of this invention to provide a time base conversion apparatus formed of a simple, straightforward arrangement of elements.

It is a further object of this invention to provide a time base conversion apparatus which can be applied to a digital video tape recording and/or playback device in which the signal format of the digitized video signal is converted.

According to an aspect of this invention, a time base converter for changing the time base of an input digital signal comprises a data input terminal; a digital output circuit; a number n of memory banks for storing the input digital signal, into which the input digital signal is written at a write clock frequency of a write clock and from which the written-in digital signal is read out at a read clock frequency of a read clock, and having a memory cycle with a writing phase and a reading phase in each period thereof and which is based on the timing of the read clock, the write clock frequency and read clock frequency being different from one another, with n being a positive integer; a number M of input latching stages for each memory bank and coupled in sequence between the data input terminal and the respective memory bank for gating a group of data words of the input digital signal in parallel form to the respective memory bank, each such latching stage having a number N of channels, each channel processing a predetermined subgroup of each group of bits, with M and N being positive integers; an output latching stage coupled to the memory banks for receiving the digital signal read out therefrom and providing the same to the digital output circuit; and a control circuit for providing control signals to the input latching stages, the memory banks, and the output latching stage to control transfer of data thereamong on the basis of the write clock and the read clock; wherein n, M and N are selected to be sufficient to prevent the loss of the input digital signal in the event that the read clock frequency is lower than the write clock frequency. Preferably, n, M and N are chosen to satisfy the inequality $$\frac{5N-4}{2(nM-1)\cdot N} < \frac{T_W}{T_R};$$

where $T_W$ is the period corresponding to the write clock frequency and $T_R$ is the period corresponding to the read clock frequency.

The above, and other objects, features, and advantages of this invention, will be apparent from the following detailed description of illustrative embodiments which is to be read in conjunction with the accompanying drawings.

BRIEF DESCRIPTION OF THE DRAWINGS

FIGS. 1 and 2 are block diagrams illustrating recording and reproducing sections, respectively, of a digital video tape recorder (DVTR) embodying this invention;

FIGS. 12A through 12V show waveforms occurring at points in the control circuit of FIGS. 10 and 11;

FIGS. 13A through 13E show waveforms useful in explaining the relation of write access to read access in the embodiment of FIG. 9;

FIG. 14 is a block diagram of a write-side control circuit for use in the embodiment of FIG. 9;

FIGS. 18A through 18K show waveforms appearing at points in the control circuits of FIGS. 16 and 17, and useful in explaining the novel features of this invention; and FIG. 19 is a block diagram showing an alternative embodiment of this invention.

DESCRIPTION OF THE PREFERRED EMBODIMENTS

In order to facilitate a better understanding of the present invention, there will first be described the conditions for digital recording of an NTSC color video signal.

The NTSC system color video signal is desirably digitized with the following conditions being established:

1. Since one frame comprises 525 lines, the number of lines selected for a first (third) and a second (fourth) field are 262 and 263, respectively. In the first field, a vertical synchronizing pulse and a horizontal synchronizing pulse are in phase with each other, and the field in which they are out of phase is considered the second field.

2. The number of sampled picture elements in each horizontal period (H) varies with the sampling frequency (fs) employed. Since the color subcarrier frequency (fsc) is 455/2 times the horizontal frequency (fh), the numbers of sampled picture elements in one horizontal period are as shown in the below Table 1 in the case of fs=3 fsc and in the case of fs=4 fsc.

TABLE 1

| fs | | Even line | Odd line |
|---|---|---|---|
| 3fsc | Odd frame | 682 | 683 |
| | Even frame | 683 | 682 |
| 4fsc | Odd frame | 910 | 910 |
| | Even frame | 910 | 910 |

In the case of fs=3 fsc, the number of sampled picture elements in the line in which the horizontal synchronizing pulse and the color subcarrier are in phase with each other is taken as 682, and the number of sampled picture elements in the line in which the horizontal synchronizing pulse and the color subcarrier are out of phase is taken as 683. The odd frame starts with the line in which the horizontal synchronizing pulse and color subcarrier are out of phase from each other, whereas the even frame starts with the line in which they are in phase with each other.

Figure 5:
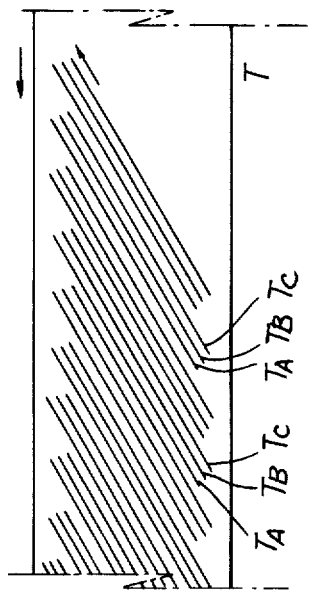
FIG. 5 is a schematic plan view of a section of magnetic tape showing tracks in which signals are recorded.
Figure 4:
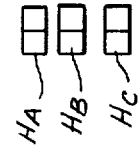
FIG. 4 is a schematic view of rotary heads included in the assembly of FIG. 3.
Figure 3:
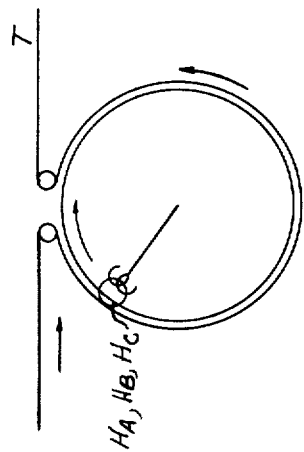
FIG. 3 is a schematic illustration of a rotary head assembly included in the DVTR of FIGS. 1 and 2.

The present invention will hereinafter be described as being applied to a DVTR made up of a recording section (FIG. 1) and a playback or reproducing section (FIG. 2). In the DVTR, a digital video signal is recorded by a rotary head assembly (FIG. 3) in parallel tracks extending obliquely on a magnetic tape T (FIG. 5). Since the transmitting bit rate of the digital video signal is high, two rotary heads $H_A$ and $H_B$ (FIG. 4) are disposed in close proximity to each other, and the digital video signals of one field are distributed through two channels to such heads and recorded on the magnetic tape in two parallel tracks $T_A$ and $T_B$. An audio signal is also converted to a PCM (pulse code modulated) signal and is recorded by a third rotary head $H_C$ is a third track $T_C$ extending parallel to the video tracks $T_A$ and $T_B$ (FIG. 5).

Referring in detail to FIG. 1, it will be seen that an NTSC color video signal to be recorded is applied through an input terminal 11 to an input processor 12. The input processor 12 comprises a clamp circuit and a synchronizing and burst signal separator and supplies the video information portion of the color video signal to an A/D converter circuit 3.

Figure 6:
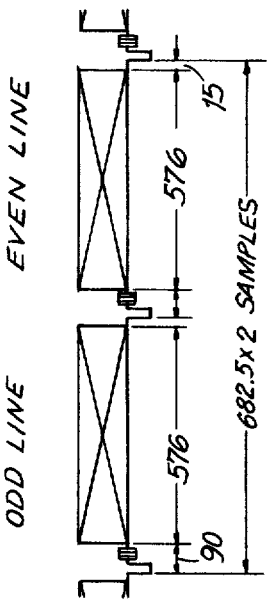
FIGS. 6, 7 and 8 are schematic diagrams to which reference will be made in explaining the digitization and code arrangement of a video signal for use in the digital VTR embodying this invention.

The A/D converter circuit 13 generally comprises a sample hold circuit and an A/D converter for converting each sampled output to an eight-bit code which is supplied, in parallel form, to an interface 14. The duration or period of one line (1H) of the NTSC color video signal is 63.5 μs and a blanking period therein is 11.1 μs. Accordingly, the effective video region or portion is 52.4 μs. When the sampling frequency is 3 fsc=(3×455/2) $f_h$, the number of samples in one horizontal period is 682.5. Further, the number of samples in the effective video region or portion is 52.4 μs/Ts=562.7 samples, where Ts is the sampling period equal to 93.1217 ns. In consideration of the division of the video information to be recorded into two channels, the number of effective video samples is selected to be 576 per line or horizontal period with 288 samples being assigned to each channel. As shown in FIG. 6, two horizontal periods (1365 samples) are considered as one unit, with the total number of samples in the line in which a horizontal synchronizing pulse HD and the color subcarrier are in phase with each other being selected to be 682 and the total number of samples in the line in which they are out of phase being selected to be 683.

Each field contains 262.5 lines and has a period of 262.5H, with a vertical synchronizing period and an equalizing pulse period accounting for 10.5H. Test signals VIT and VIR inserted in the vertical blanking period are also regarding as effective video signals.

Finally, the number of effective video lines in one field period is selected to be 252.

The digitized effective video region of the color video signal is divided by the interface 14 into two channels. Of the 576 samples in each line, data corresponding to the odd-numbered samples are assigned to one channel and data corresponding to the even-numbered samples are assigned to the other channel. The data of the two channels are processed in the same manner. An external digital video signal $D_{ex'}$ for example, from an editing apparatus, may also be supplied to interface 14 to be suitably divided into two channels. The data in one of the channels is derived as a record signal for head $H_A$ at an output terminal 1A after being supplied, in sequence, to a time base compression circuit 15A, an error control encoder 16A, a recording processor 17A and a recording amplifier 18A. The data in the other channel is also processed by the same arrangement, that is, by a time base compression circuit 15B, an error control encoder 16B, a recording processor 17B and a recording amplifier 18B, to provide a record signal for head $H_B$ at an output terminal 1B. The output terminals 1A and 1B are connected by way of a rotary transformer (not shown) to the rotary heads $H_A$ and $H_B$ disposed to close axial proximity to each other.

A synchronizing signal and a burst signal separated from the color video signal by processor 12 are applied to a master clock generator 21 which is desirably of PLL (phase locked loop) construction. The master clock generator 21 generates clock pulses of the sampling frequency, for example, 3 fsc. The clock pulses from generator 21 and the synchronizing signal are applied to a control signal generator 22 which produces various kind of timing pulses, identification signals (ID) for identifying lines, fields, frames and tracks, and a control signal, such as, a train of sampling pulses.

Figure 8:
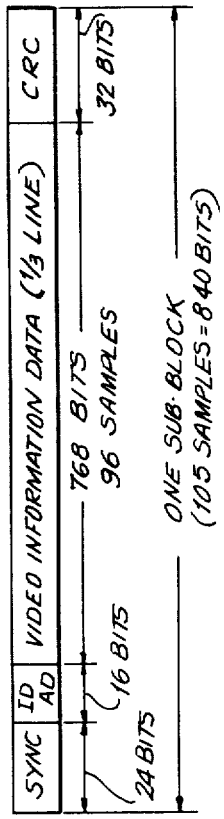

The code arrangement of each of the record signals respectively provided at the output terminals 1A and 1B will now be described with reference to FIG. 8. As there shown, a sub-block of the coded digital signal is composed of 105 samples (840 bits) in which a block synchronizing signal (SYNC) of three samples (24 bits) and identifying and address signal (ID/AD) of two samples (16 bits), information data of 96 samples (768 bits) and a CRC (Cyclic Redundancy Check) code of four samples (32 bits) are arranged serially one after another. The data of one line or horizontal period of the color video signal comprises 288 samples per channel, as previously mentioned, and these samples are divided into three, that is, there are three sub-blocks for each line, with 96 samples for each sub-block. The block synchronizing signal is used for identifying the beginning of a sub-block, whereupon the identifying and address signals, the information data and/or CRC code can be extracted. The identifying signals ID indicate the channel (track), the frame, the field and the line to which the information data of the sub-block belongs, and the address signal AD represents the address of the respective sub-block. The CRC code is used for the detection of an error in the information data of the respective sub-block.

Figure 7:
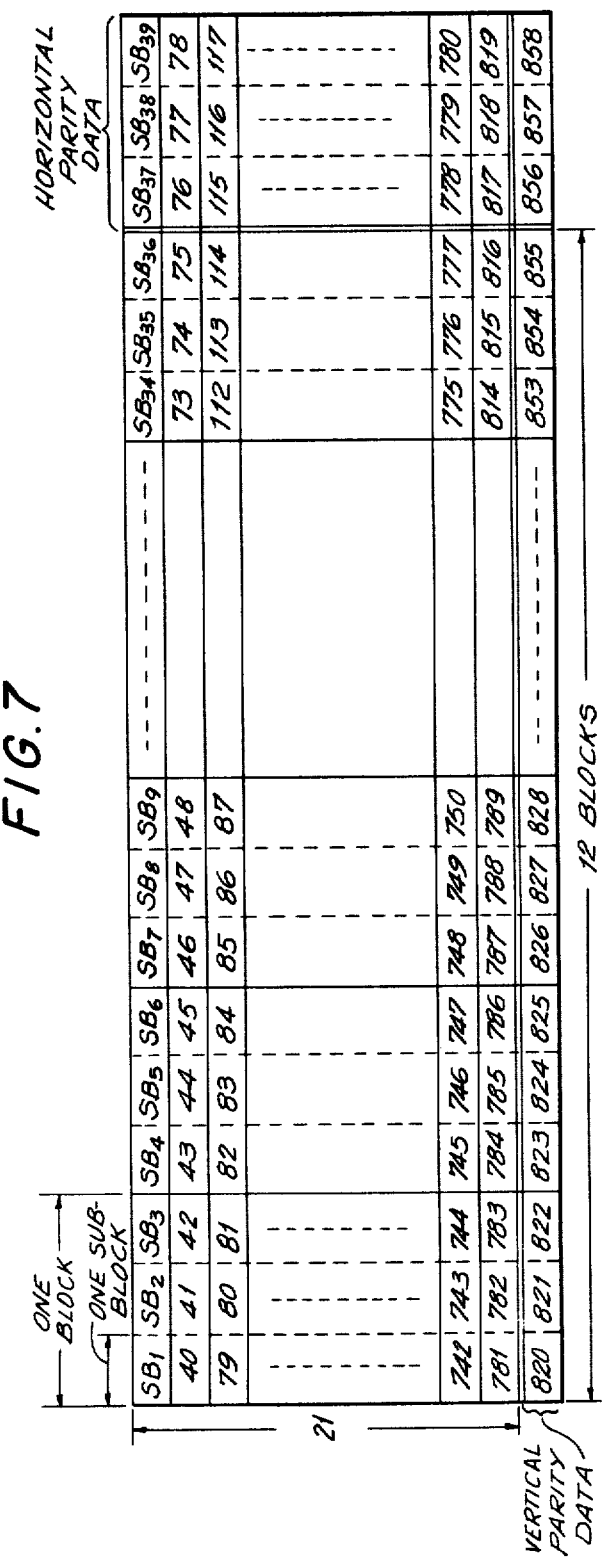

FIG. 7 shows the code arrangement for one field in one channel. In FIG. 7, each reference character SBi (i-1 to 858) indicates one sub-block, with three sub-blocks making up one block or line. Since the effective video region of one field is comprised of 252 lines, as mentioned previously, the data of 252 blocks (756 sub-blocks) exist in one field. The video information data of a particular field are sequentially arranged in a 21×12 matrix form. Parity data are also provided in connection with the horizontal and vertical directions, respectively, of the video information data in the matrix. More particularly, on FIG. 7, the parity data for the horizontal direction is shown positioned in the thirteenth column of blocks, and the parity data for the vertical direction is positioned in the twenty-second row at the bottom. In the thirteenth column of blocks at the twenty-second row is disposed the horizontal parity data for the vertical parity data. The parity data for the horizontal direction is formed in three ways by 12 sub-blocks respectively taken out of the 12 blocks forming one row of the matrix. In the first row, for example, parity data $SB_{37}$ is formed by the modulo 2 addition:

$$[SB_1] \oplus [SB_4] \oplus [SB_7] \ldots \oplus [SB_{34}] = [SB_{37}]$$

In the above, [SBi] means only the data in the respective sub-block SBi. In this case, samples belonging to respective ones of the 12 sub-blocks are each calculated in a parallel, 8-bit form. Similarly, by modulo-2 addition:

$$[SB_2] \oplus [SB_5] \oplus [SB_8] \oplus \ldots \oplus [SB_{35}] = [SB_{38}]$$

$$[SB_3] \oplus [SB_6] \oplus [SB_9] \oplus \ldots \oplus [SB_{36}] = [SB_{39}]$$

parity data $[SB_{38}]$ and $[SB_{39}]$ are formed. The parity data are similarly formed for each of the second to twenty-second rows in the horizontal direction. Enhancement of the error correcting ability results from the fact that parity data is not formed merely by the data of the thirty-six sub-blocks included in a row, but is formed by the data of 12 sub-blocks positioned at intervals of two sub-blocks in the row.

The parity data for the vertical direction is formed by the data of twenty-one sub-blocks in each of the first to twelfth columns of blocks. In the first column, parity data $[SB_{820}]$ is formed by the modulo 2 addition:

$$[SB_1] \oplus [SB_{40}] \oplus [SB_{79}] \oplus \ldots [WB_{781}] = [SB_{820}]$$

In this case, samples belonging to each one of the 21 sub-blocks are each calculated in a parallel 8-bit form.

Accordingly, these parity data comprise 96 samples as is also the case with the video data of each sub-block. In the case of transmitting the digital signal of one field of the above matrix arrangement (22×13) as a series of first, second, third, ... twenty-second rows in sequence, since 13 blocks correspond to the length of 12H, a period of 12×22=264H is needed for transmitting the digital signal of one field.

Incidentally, if the VTR is of the "C-format" type, and thus employs an auxiliary head for recording and reproducing one part of the vertical blanking period in one field, then a duration of only about 250H can be recorded with a video head. In accordance with the present invention, a duration of 246H, leaving a margin of several H's, has to be recorded in each track, that is, the period of 264H of data to be transmitted is time-base-compressed (with a compression ratio Rt of 41/44) to a period of duration of 246H. Further, a pre-amble signal and a post-amble signal, each used in establishing the transmitting bit frequency, are inserted at the beginning and the terminating end of the record signal of one field having the period of 264H.

The time base compression circuits 15A and 15B in FIG. 1 compress the video data with the above-noted compression ratio 41/44 and provide a data blanking period in which the block synchronizing signal, the identifying and address signals and the CRC code are inserted for each sub-block of video data of 96 samples, and at the same time, set up data blanking periods in which the blocks of the parity data are inserted. The parity data for the horizontal and vertical directions and the CRC code of each sub-block are generated by the error control encoders 16A and 16B. The block synchronizing signal and the identifying and address signals are added to the video data in the recording processors 17A and 17B. The address signal AD represents the previously noted number (i) of the sub-block. Further, in each recording processor 17A, 17B there are provided an encoder of the block coding type which converts the number of bits of one sample from 8 to 10, and a parallel-to-serial converter for serializing the parallel 10-bit code. As disclosed in detail in U.S. patent application Ser. No. 171,481, filed July 23, 1980, and having a common assignee herewith, the block coding is such that $2^8$ codes whose DC levels are close to zero are selected from $2^{10}$ codes of 10-bit and arranged to have one-to-one correspondence to the original 8-bit codes. By means of the foregoing, the DC level of the record signal is made as close to zero as possible, that is, "0" to "1" alternate with each other as much as possible. Such block coding is employed for preventing degradation of the transmitting waveform on the playback side by ensuring substantially DC-free transmission. It is also possible to achieve good results by employing a scramble system utilizing the so-called M-sequence, which is substantially random, in place of the block coding. In the case where each sample comprises 8 bits, the transmitting bit rate per channel is as follows:

$$(3 \text{ fsc}) \times 8 \times \tfrac{1}{2} \times 44/41 = 46.097 \times 10^6 \text{ Bits/sec, or } 46.097 \text{ MB/sec.}$$

After converting the above 8-bit code to the 10-bit code, the recording bit rate is as follows:

$$46.097 \times 10/8 = 57.62 \text{ MB/sec.}$$

In the reproducing or playback operation of the digital VTR according to this invention, the two channels of reproduced signals are derived from the heads $H_A$ and $H_B$ which scan tracks $T_A$ and $T_B$, respectively, corresponding thereto, and applied to reproduced signal input terminals 2A and 2B, shown in FIG. 2. The reproduced signals are applied from terminals 2A and 2B through playback amplifier and waveform shaping circuits 31A and 31B, respectively. Each of the amplifier and waveform shaping circuits 31A and 31B includes a playback equalizer for increasing the high-frequency component of the reproduced signal and shapes the reproduced signal to a clear pulse signal. Further, each waveform shaping circuit 31A or 31B extracts a reproducing bit clock synchronized with the pre-amble signal and supplies the reproducing bit clock to a respective playback processor 32A or 32B together with the data. In each of the playback processors 32A and 32B, the serial data is converted to parallel form, the block synchronizing signal is extracted, the data is separated from the block synchronizing signal and from the ID, AD, and CRC codes or signals, and further, block decoding or 10-bit-to-8-bit conversion is performed. The resulting data is applied to respective time base correctors 33A and 33B in which any time base error is removed from the data. Each of the time base correctors 33A and 33B is provided with, for example, four memories, in which reproduced data are sequentially written by clock pulses synchronized with the reproduced data, and the data are sequentially read out from the memories, by reference clock pulses. When the reading operation is likely to overtake the writing operation, the memory from which the data has jsut been read is read again.

The data of each channel is provided from the respective one of the time base correctors 33A and 33B to one or the other of error correcting decoders 34A and 34B. Each error correcting decoder 34A and 34B includes error detecting and correcting circuits using CRC, horizontal and vertical parities, a field memory and so on, as described in detail in copending U.S. patent application Ser. No. 192,358, now U.S. Pat. No. 4,329,708, having a common assignee herewith. However, during high speed reproducing, error detection and correction are not carried out and the field memory is used instead for converting the intermittently received reproduced data of each channel into a continuous form. The data from each error correcting decoder 34A or 34B is applied to a respective time base expander circuit 35A or 35B, to perform a function complementary to that of compression circuits 15A and 15B, and thereby to return the data to the original transmitting rate. The data are then applied to a common interface 36. Interface 36 serves to return the reproduced data of the two channels into a single channel which includes a D/A converter circuit 37 for conversion of the data into analog form, and an output processor 38. From the interface 36 there may also be provided a digital video output $D_{OUT}$. Since a digital video input and a digital video output are provided in the recording and reproducing sections of FIGS. 1 and 2, editing and dubbing can be carried out with digital signals, that is, without conversion from and/or to analog form.

The output from D/A converter circuit 37 is applied to output processor 38, which provides a reproduced color video signal at an output terminal 39. An external reference signal is supplied from a terminal 40 to a master clock generator 41, from which clock pulses and a reference synchronizing signal are provided to a control signal generator 42. The control signal generator 42 provides control signals synchronized with the external reference signal, e.g. various timing pulses, identifying signals for the line, field and frame, and sample clock pulses. In the reproducing section, the processing of the signals from input terminals 2A and 2B to the input sides of time base correctors 33A and 33B is timed by the clock pulse extracted from the reproduced data, whereas the processing of the signals from the output sides of the time base correctors 33A and 33B to the output terminal 39 is timed by the clock pulse from the master clock generator 41.

Figure 9:
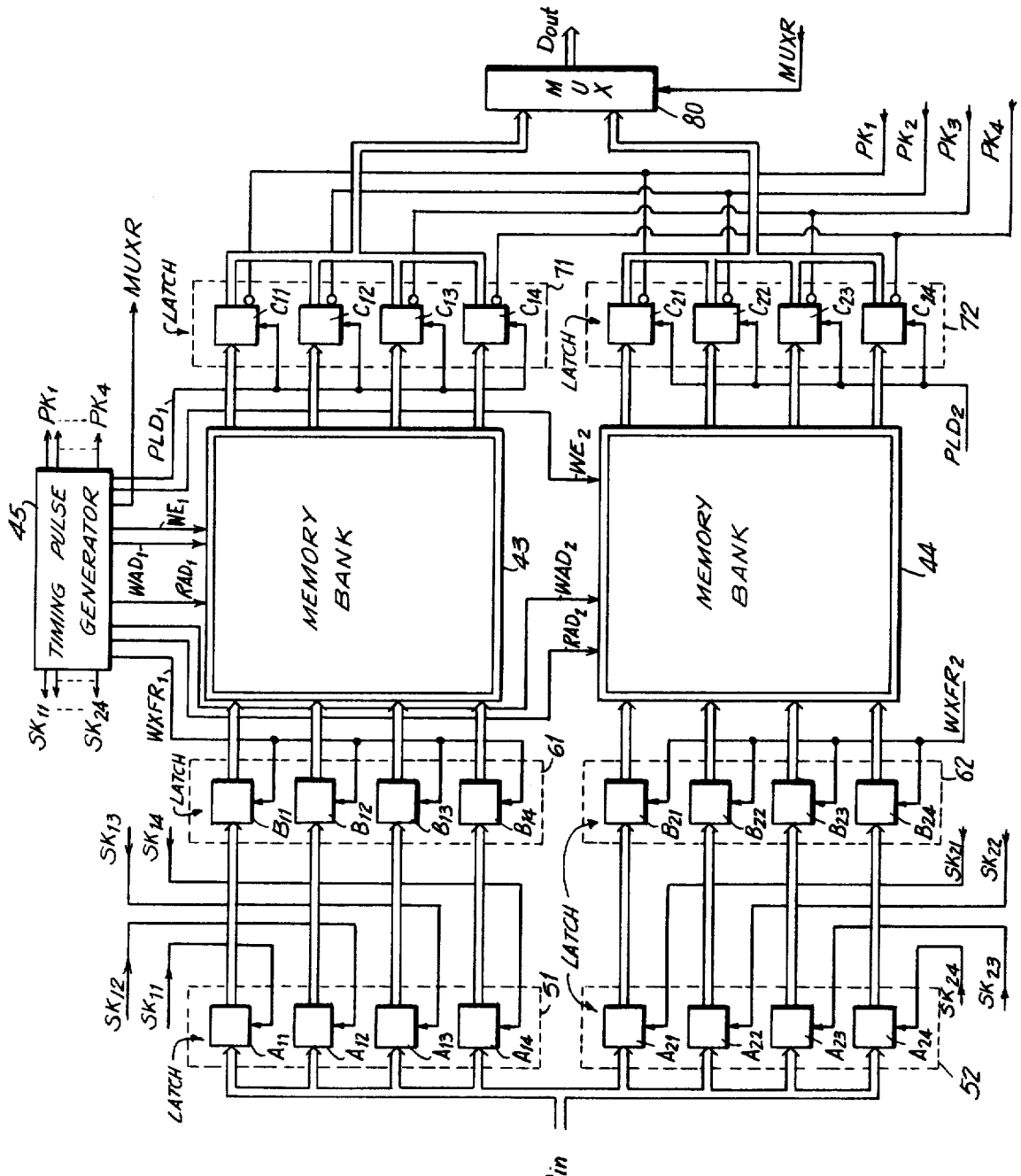
FIG. 9 is a block diagram of one embodiment of a time base converter according to this invention.

An embodiment of the time base conversion apparatus according to this invention is employed as each of the time base expansion circuits 35A and 35B, and is described hereafter in detail, initially with reference to FIG. 9.

In the time base conversion apparatus of FIG. 9, serial-to-parallel conversion of data words is performed for every four samples, wherein each sample consists of one eight-bit word. The four eight-bit words are then processed in the apparatus as a thirty-two-bit word.

The time base conversion apparatus of FIG. 9 comprises first and second memory banks 43 and 44, each comprised of a random-access memory (RAM) together with appropriate associated control circuitry. The apparatus of FIG. 9 also comprises a timing pulse generator 45 for generating various timing signals in the proper sequence. Series-to-parallel conversion of circuits 51 and 52 associated with the respective memory banks 43, 44 are provided to convert four consecutive eight-bit data words of input data $D_{in}$ to a 32-bit block of data, and each of series-to-parallel conversion circuits 51 and 52 is formed of latch circuits $A_{11}$–$A_{14}$ and $A_{21}$–$A_{24}$, respectively.

Following the series-to-parallel conversion circuit 51, 52 are buffers 61, 62 which are also formed of respective four latch circuits $B_{11}$–$B_{14}$ and $B_{21}$–$B_{24}$. Each of buffers 61 and 62 presents a 32-bit word to be written into the associated memory bank 43, 44.

Parallel-to-series converters 71 and 72 are associated with the respective memory banks 43, 44 to receive the 32-bit data words read out therefrom and to convert the same to a sequence of four eight-bit data words. Each of the parallel-to-serial conversion circuits 71, 72 is formed of respective four latch circuits $C_{11}$–$C_{14}$ and $C_{21}$–$C_{24}$. The serialized eight-bit data words read out from the memory banks 43, 44 are then provided to a multiplexer 80 where the data words from the two memory banks 43, 44 are combined to provide a time-base expanded stream of data words, $D_{OUT}$, in the same order as the input data $D_{IN}$.

As described heretofore, the write clock frequency and read clock frequency are different from one another and are asynchronous with one another. In accordance with this invention, the memory cycle can be synchronized with either a write clock or a read clock, but in this embodiment, the memory cycle is synchronized on the basis of the read clock, because upon reproduction by the DVTR, the read clock is synchronized with an external, or off-tape clock. Therefore, in the writing and reading operations of the time base conversion apparatus described herein, difficulties, such as overwriting, will occur during a write-in operation, but will not occur during a read-out operation. Accordingly, the described embodiment is directed to the problem of data loss when writing the data into memory banks 43 and 44.

Figure 10:
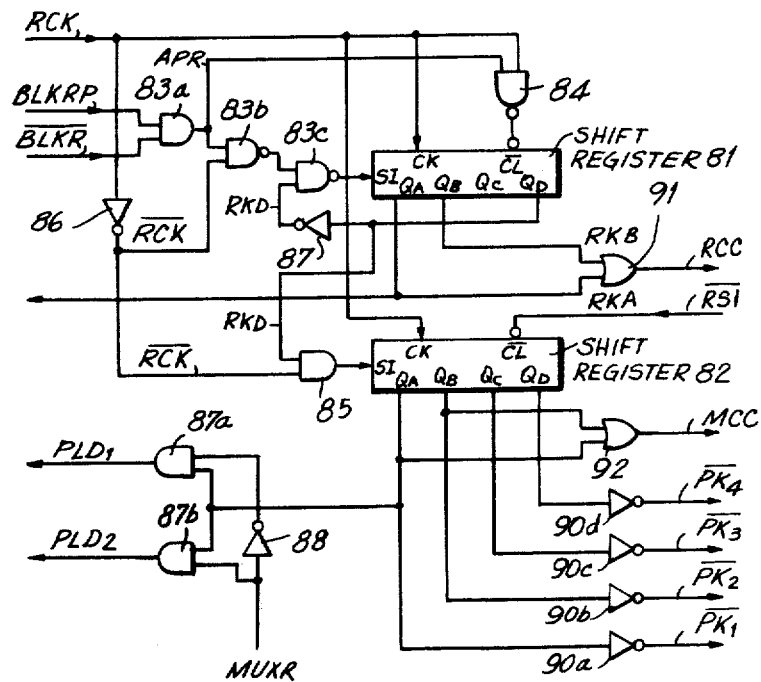
FIGS. 10 and 11 are diagrams of read-side control circuits for use in the embodiment of FIG. 9.
Figure 11:
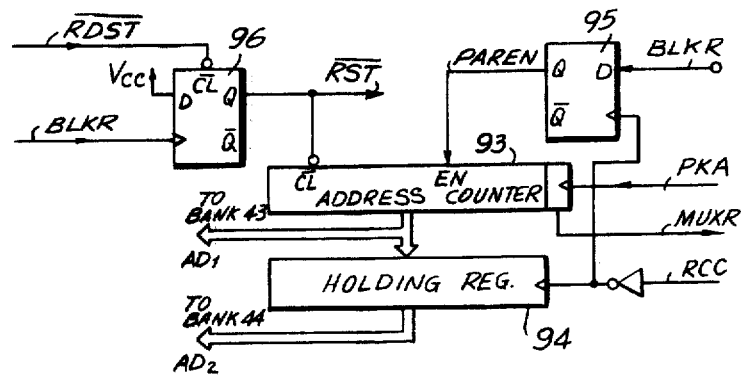

Timing pulse generator 45 includes within it control signal generating circuitry, such as that shown in FIGS. 10 and 11. The circuit shown in FIG. 10, which provides read control signals for controlling the read-out operation of the apparatus, includes shift registers 81 and 82. A chain formed of AND gate 83a and NAND gates 83b, 83c is coupled to a serial input terminal SI of shift register 81 and a NAND gate 84 is coupled to the clear terminal $\overline{CL}$ thereof. Another AND gate 85 has inputs coupled to an output $Q_D$ shift register 81 and to an inverter 86. Another inverter 87 is coupled from output $Q_D$ of shift register 81 to an input of NAND gate 83c. AND gates 87a and 87b each have one input thereof coupled to an output $Q_A$ of shift register 82, and an inverter 88 is coupled to another input of AND gate 87a. Inverters 90a–90d are coupled to outputs $Q_A$–$Q_D$ of shift register 82, and OR gates 91 and 92 each have inputs coupled to the output terminals $Q_A$ and $Q_B$ of shift registers 81 and 82, respectively.

As mentioned above, in the DVTR, when time-base compression or expansion is carried out, a conversion from one predetermined signal format to another is also carried out. For this reason, when expanding the time base during playback, data words are read out as a predetermined block unit; hence a block signal $\overline{BLKR}$ (FIG. 12A) is generated to indicate that the block unit is formed and that a reading operation should commence. An inverted version thereof, BKLR, is provided to one input of gate 83a. At the same time read clock pulses RCK (FIG. 12B) having a period $T_R$ are applied to clock input terminals of shift registers 81 and 82 and to one input of gate 84. Another signal BLKRP (FIG. 12C) having a leading edge in advance of signal BLKR by one read clock pulse period $T_R$, is applied to another terminal of gate 83a so that the latter provides a pulse APR (FIG. 12D) having a width $T_R$ and appearing just in advance of the front edge of signal BLKR. This pulse APR is provided to gate the clock pulses RCK in gate 82b so that the one clock pulse RCK is applied to serial input terminal SI of shift register 81. Thus, shift register 81 provides at its output terminal $Q_A$–$Q_D$, respectively, pulses RKA (FIG. 12E), RKB (FIG. 12F), RKC (not shown), and RKD (FIG. 12G), each of which has a pulse width $T_R$ and a period of $4T_R$, (i.e. a duty cycle of 25 percent) and which are separated from one another in phase by 90 degrees. Thus, pulses RKA–RKD are provided repeatedly at every interval of $4T_R$ beginning with the leading edge of block signal BLKR. The pulse RKD provided at output terminal $Q_D$ of shift register 81 is also fed back to the serial terminal SI thereof, and is also fed through gate 85 to the serial input terminal SI of shift register 82. Similarly shift register 82 also provides from its output terminal $Q_A$–$Q_D$ thereof pulses $PK_1$, $PK_2$, $PK_3$ and $PK_4$ (FIGS. 12H, 12I, 12J and 12K, respectively), each of which has a pulse width $T_R$, and a period of $4T_R$, with a duty cycle of 25 percent, and which are separated in phase from one another by 90 degrees. Thus, pulses $PK_1$–$PK_4$ are sequentially provided beginning after the lapse of one period $4T_R$ from the leading edge of block signal BLKR.

Pulses RKA and RKB from shift register 82 are combined in OR gate 91 to provide a read-cycle control signal RCC (FIG. 12L), while pulses $PK_1$ and $PK_2$ from shift register 92 are combined in OR gate 92 to form memory-control cycle signal MCC (FIG. 12M). In this embodiment, the period of signal RCC is $4T_R$ when the period of the clock pulse RCK is $T_R$, with the result that four clock pulses RCK will appear during each period of signal RCC. During a writing operation, the eight-bit data words are processed, in parallel four-at-a-time for writing thereof into memory banks 43, 44. During a reading operation, this necessitates processing of the data words in parallel four at a time. Thus, one period of the read control cycle signal RCC is the unit of time required for performing a read-access operation for each four data words, and for parallel-to-serial conversion of the read out data words. Therefore, in this embodiment, the period $T_R$ corresponds to the time required for processing one eight-bit data word.

Memory cycle control signal MCC, which defines the memory cycle, has an interval during which signal MCC is "1" to identify the interval when a write operation is performed, and an interval during which it is "0" to define the interval when a read operation is performed. Because the memory cycle is synchronized with the reading clock, the signal MCC is substantially in synchronism with signal RCC. However, as will be described in detail below, signal MCC is somewhat distorted whenever such signal is resynchronized with signal RCC, particularly near the leading edge of read block signal BLKR.

The respective pulse widths of read block signal BLKR (FIG. 13A) and the corresponding write block signal BLKW (FIG. 13D), which indicate the period of one block of data words of input data to be read out from data banks 43, 44 and to be written therein, can be expressed in terms of the number of data words in each block, and therefore also in terms of the number of reading clock pulses RCK and writing clock pulses WCK required for each block of data words. Thus, it is desirable that the number N of data words to be converted to parallel form be selected to be a divisor of the widths of signals BLKR and BLKW. In this embodiment, the number N of eight-bit data words to be converted to a parallel group of words equals 4, and will satisfy this condition.

Accordingly, in this embodiment, block signal BLKR has a width which is an integral multiple of the period $4T_R$, and hence coincides with an integral multiple of the width of signal RCC. Further, in this embodiment write block signal BLKW has a width which corresponds to an integral multiple of four times the period $T_W$ of write clock signal WCK. Thus, a write-cycle control signal WCC (FIG. 13E) corresponding to the signal required for performing the conversion of the input data words to parallel form, and the writing thereof into memory banks 43, 44, has a period $4T_W$ and is synchronized with block signal BLKW.

However, because the read operation and write operation are not synchronized with each other and are carried out at different speeds, the interval between adjacent read block signals BLKR is not necessarily an integral multiple of four $T_R$. Thus, it is necessary to synchronize signal RCC with block signal BLKR, and priority is given to the reading operation, with the result that signal RCC is re-synchronized at the leading edge of block signal BLKR. Consequently, as shown in FIG. 13B, a discontinuity appears in signal RCC.

At the same time, signal MCC is also being synchronized with signal RCC. However, because signal MCC is not controlled by block signal BLKR, the signal MCC is synchronized instead with the next rising edge of signal RCC, and signal MCC is synchronized therewith after a delay of almost one complete cycle. When this happens, memory-cycle control signal MCC becomes discontinuous at the point thereof corresponding to the leading edge of block signal BLKR, and the corresponding write operation is delayed, with the possible result that data words are not written into memory banks 43, 44 at the appropriate time, and the phenomenon of overwriting results. In such overwriting, consecutive data words are written into the same storage locations, and the information value of such data is destroyed. This is particularly likely to happen when the writing speed is greater than the reading speed.

As shown in FIG. 11, pulse RKA from shift register 81 is applied to an address counter 93. The least significant bit (LSB) of counter 93 is used as an output select signal MUXR (FIG. 12N) to select an appropriate one of memory banks 43, 44, while the bits higher than bit LSB are used as the address information to address memory bank 43.

The address information from counter 93 is also applied to a holding register 94. Register 94 is supplied at a clocking terminal thereof with an inverted version of signal RCC, and falling of such signal causes the address information from counter 93 (corresponding to the bits higher than the LSB) to be transferred to register 94. Accordingly, register 94 provides the address information of counter 93, but delayed by one period of signal RCC, to memory bank 44 as its address information, and the RAMs of memory banks 43 and 44 are enabled to perform a read access operation. However, because the RAMs of memory banks 43 and 44 must be enabled only at the addresses thereof other than that at which a write access operation is being performed, the timing of address counter 93 must be controlled, and D-type flip-flops 95 and 96 are provided to achieve this. The inverted version of signal RCC is applied to a clock input of flip-flop 95, and block signal BLKR is applied to the D-input terminal thereof, with the result that the Q terminal of flip-flop 95 provides a signal PAREN (FIG. 12R) which is delayed behind block signal BLKR by one-half cycle of signal RCC. Signal PAREN is applied to an enable terminal EN of counter 93 so that the latter will be able to count during the interval that signal PAREN is "1".

A pulse RDST (FIG. 12Q), which is formed from a reference signal at the beginning of each field of the digital video signal, is applied to a clear terminal CL of D-type flip-flop 96. Block signal BLKR is applied to the clock terminal thereof and a voltage $V_{CC}$ is applied to the D-terminal thereof so that the Q-terminal of flip-flop 96 provides a signal $\overline{RST}$ (FIG. 12S) that falls at the leading edge of the inverted version of signal RDST, and rises at the front edge of block signal BLKR. This signal $\overline{RST}$ is applied to a clear terminal $\overline{CL}$ of counter 93 and also to a clear terminal CL of shift register 82 (FIG. 10).

Address counter 93 increments at each rising edge of pulse RKA to change the address of memory bank 43 and correspondingly changes the address of the memory bank 43 in order: "0", "1", "2" . . . , as shown in FIG. 12T. Correspondingly, the address of memory bank 44, as instructed by register 94, is changed, with the delay of one cycle of signal RCC, from that of memory bank 43, as shown in FIG. 12U.

During an interval in which signal MUXR is "0", the pulse $PK_1$ from shift register 92 is gated in gate 87a to provide a load pulse $PLD_1$ (FIG. 12O), while during an interval in which signal MUXR is "1" pulse $PK_1$ is gated in gate 87b to obtain a load pulse $PLD_2$ (FIG. 12P). Load pulses $PLD_1$ and $PLD_2$ are applied to memory banks 43 and 44 respectively. Thus, each parallel group of four data words is read out from the address in memory bank 43 as determined by counter 93, whenever signal MCC is "0" and is latched in each of the four latch circuits $C_{11}$–$C_{14}$ of parallel-to-serial conversion circuit 71 in response to the load pulse $PLD_1$. During each cycle of signal RCC, whenever signal MUXR is "0", latch circuits $C_{11}$–$C_{14}$ are latched by pulses $PK_1$–$PK_4$. Correspondingly, the data read out from memory bank 43 are converted to sequences of four eight-bit words in conversion circuit 71 to provide the data in their original sequence to multiplexer 80.

Similarly, each parallel group of four data words in memory bank 44, from an address determined by register 94, is read out from memory bank 44 during the read cycle and is latched in each of the four latch circuits $C_{21}$–$C_{24}$ of the parallel-to-serial conversion circuit 72 upon occurrence of load pulse $PLD_2$. Then, during each one cycle of signal RCC whenever signal MUXR is "1", latch circuits $C_{21}$–$C_{24}$ are sequentially gated by pulses $PK_1-PK_4$. As a result, in the same manner as in conversion circuit 71, the conversion circuit 72 provides the eight data words in their original data sequence of four words which are then combined in multiplexer 80 with the data provided from conversion circuit 71 to provide output data signal $D_{OUT}$ (FIG. 12V). Thus, as described herein, data read out from memory banks 43 and 44 are converted back to eight words in serial form to provide the output signal $D_{OUT}$.

The corresponding writing operation for writing data words into memory banks 43 and 44, will be described with reference to FIGS. 14-18.

The write control circuit shown in FIG. 14 includes a shift register 101 and a logic circuit formed of NAND gates 102a, 102b and an inverter 102c. Write clock signals WCK (FIG. 14C) having a period $T_W$ is applied to a clock terminal CK of register 101 and an inverted version $\overline{BLKW}$ of writing block signal BLKW (FIG. 15B) and a signal BLKWP which leads the phase of signal BLKW by one write clock pulse period $T_W$ are applied to NAND gate 102a whose output is applied to one input of NAND gate 102b. A pulse WKD (FIG. 15G) obtained from one output terminal $Q_D$ of shift register 101 is applied through inverter 102c to another input of NAND gate 102b, and the latter applies its output to serial input terminal SI of shift register 101. An OR gate 103 has its input coupled to receive signals BLKW and BLKWP and its output coupled to a clear terminal $\overline{CL}$ of shift register 101 to clear the same whenever both signals BLKW and BLKWP are "0". As a result, shift register 101 provides, at its outputs $Q_A-Q_D$, pulses WKA, WKB, WKC, and WKD (FIGS. 15D, 15E, 15F, and 15G, respectively) each of which has a pulse width $T_W$ and period $4T_W$, and which are sequentially shifted in phase with respect to one another by 90°. In other words, at each interval of duration $4T_W$ beginning with the leading edge of write block signal BLKW, pulses WKA-WKD are provided in sequence. The output of OR gate 103 is provided to the clear terminal $\overline{CL}$ of a D-type flip-flop 104. Pulse WKA from terminal $Q_A$ of shift register 101 is applied to the clock terminal of flip-flop 104, and an inverted output $\overline{FQ}$ thereof is applied to its D-terminal. Thus, D-type flip-flop 104 provides an output FQ (FIG. 15H) whose state is inverted after each duration of $4T_W$ beginning with the leading edge of block signal BLKW. AND gate 105a, 105b, 105c and 105d each have a respective input thereof coupled to receive pulses WKA, WKB, WKC and WKD, and have another input terminal coupled to receive an inverted version $\overline{WCK}$ of clock pulse WCK. The outputs of gates 105a-105d are each coupled to inputs of AND gates 107a-107b and to inputs of AND gates 108a-108d, respectively. Output FQ from flip-flop 104 is provided to another terminal of each of gates 107a-107d while the inverted output $\overline{FQ}$ therefrom is provided to another input of each of gates 108a-108d, respectively. Thus, gates 107a-107d provides pulses $SK_{11}$, $SK_{12}$, $SK_{13}$ and $SK_{14}$, (FIGS. 15I, 15J, 15K and 15L), while AND gates 108a-108d provide pulses $SK_{21}$, $SK_{22}$, $SK_{23}$ and $SK_{24}$ (FIGS. 15O, 15Q, 15R and 15S).

Another AND gate 109 has inputs coupled to receive pulse WKD and block signal BLKW, and an output coupled to inputs of AND gates 110a and 110b. Gate 110a has another input terminal coupled to receive output FQ from flip-flop 104 and provides at its output a pulse $WCP_1$ (FIG. 15N). Gate 110b has an input thereof coupled to receive inverted output $\overline{FQ}$ from flip-flop 104, and provides at its output a pulse $WCP_2$ (FIG. 15U).

Figure 15M:
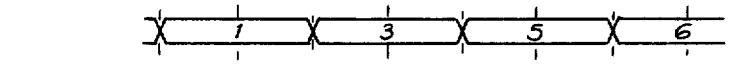
FIGS. 15A through 15U show waveforms appearing at various points in the control circuit of FIG. 14.
Figure 15T:
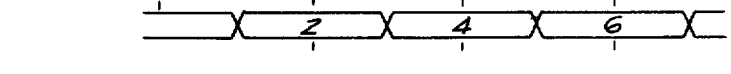

Pulses $SK_{11}-SK_{14}$ are respectively applied to latch circuits $A_{11}-A_{14}$ of serial-to-parallel conversion circuit 51 as latch pulses, while pulses $SK_{21}-SK_{24}$ are respectively applied to latch circuits $A_{21}-A_{24}$ of serial-to-parallel conversion circuit 52 as latch pulses therefor. Accordingly, if the digital input signal $D_{IN}$ (FIG. 15A) is considered in groups of four eight-bit data words, e.g., groups 1, 2, 3, 4, ... beginning from the onset of block signal BLKW, the four data words comprising each odd-numbered group are sequentially latched one at a time in latch circuits $A_{11}-A_{14}$ by respective pulses $SK_{11}-SK_{14}$, as shown in FIG. 15M, while the four data words comprising each even-numbered group are latched sequentially one at a time in latch circuits $A_{21}-A_{24}$ by respective pulses $SK_{21}-SK_{24}$, as shown in FIG. 15T.

The completion of the latching operation for each group of four data words is marked by the falling, or trailing edges of pulses $WCP_1$ and $WCP_2$. Thus, upon the occurrence of the trailing edges of such pulses $WCP_1$ and $WCP_2$, one pair of parallel groups of four data words is transferred to buffer circuits 61 and 62, but the transfer of such groups is to be carried out only after the immediately preceding pair of groups of four data words have been written into the respective memory banks 43 and 44. This provision prevents data from failing to be written into memory banks 43 and 44. As the operations of transferring the data words from the buffers 61 and 62 to the respective memory banks 43 and 44 are substantially identical, only the operation with respect to memory bank 43 will be herein described in detail.

Figure 16:
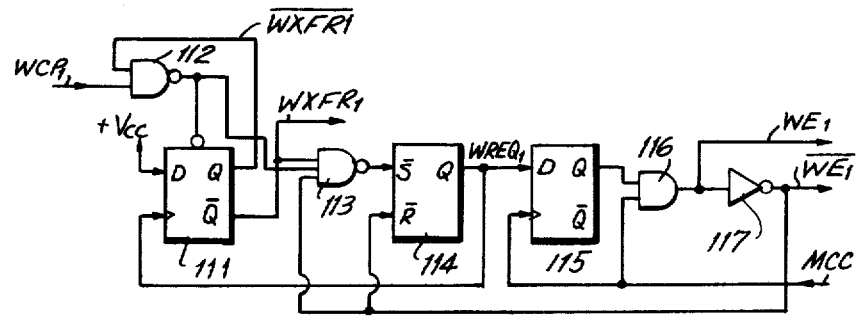
FIGS. 16 and 17 are block diagrams of write-side control circuits for use in the embodiment of FIG. 9.

As shown in FIG. 16, the control circuit for memory 43 includes a D-type flip-flop 111 and a NAND gate 112 whose output is coupled to the clear terminal CL of flip-flop 111 and having an input coupled to an output terminal Q of flip-flop 111. An inverted output terminal $\overline{Q}$ of flip-flop 111 is coupled through a NAND gate 113 to the set terminal of an RS flip-flop 114, whose output Q is coupled to the D-input of another D-type flip-flop 115. Output terminal Q of flip-flop 114 is also coupled to a clocking input of first D-type flip-flop 111. An output terminal Q of flip-flop 115 is coupled to an AND gate 116 whose output is coupled to an inverter 117. Inverter 117 applies to its output $WE_1$ to the reset terminal R of flip-flop 114 and to an input terminal of NAND gate 113, which has yet another input terminal coupled to the output of NAND gate 112. The output of inverted output terminal Q of flip-flop 111 is a data transfer request $WXFR_1$ (FIG. 18E) which rises upon the occurrence of the trailing, or falling edge of pulse $WCP_1$ (FIG. 18D) and falls upon the occurrence of the leading, or rising edge of the output $WREQ_1$ (FIG. 18F) of RS flip-flop 114. In other words, when signal $WXFR_1$ is "1", data can be transferred from serial-to-parallel conversion circuit 51 to buffer circuit 61. Signal $WXFR_1$ is also fed to latch circuits $B_{11}$ to $B_{14}$ of buffer circuit 61 for latching the same so that the parallel group of four data words from conversion circuit 51 is transferred to the respective latch circuits $B_{11}-B_{14}$ at the same time of the falling or trailing edge of each signal $WXFR_1$ (FIG. 18G).

RS flip-flop 114 is set when the output $WE_1$ (FIG. 18I) of AND gate 116 is "0" and the signal $WXFR_1$ is "1", and is reset when output $WE_1$ rises to "1". Signal $WREQ_1$ is a write request signal for the transfer of data from buffer circuit 61 into memory bank 43, and its condition "1" indicates that it is appropriate to execute writing into memory bank 43.

D-type flip-flop 115 has signal WREQ$_1$ applied to its D-input, and memory-cycle control signal MCC (FIG. 18H) is applied as a clock thereto, so that the output of flip-flop 115 will be "1" when signal WREQ$_1$ is "1" at the rising or leading edge of signal MCC, and the onset of the write operation is indicated at the output of D-type flip-flop 115. However, because a write operation can be executed only during an interval in which the memory-cycle control signal MCC is "1", the latter signal MCC is applied to an input terminal of gate 116, and the output thereof WE$_1$ (FIG. 18I) is used as the write execute signal for memory bank 43.

Figure 17:
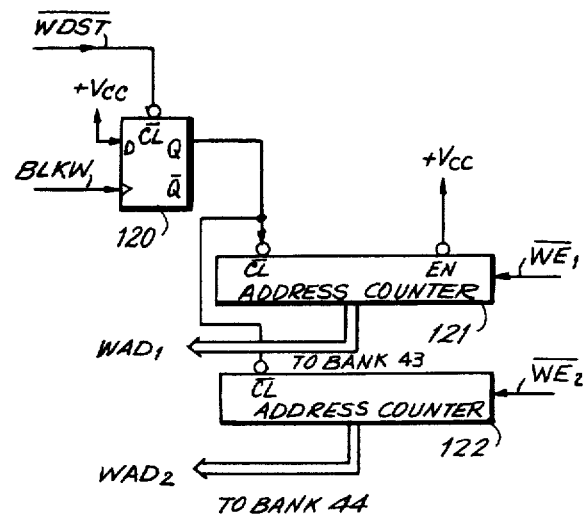

The write-address control circuit shown in FIG. 17 controls the addressing of memory bank 43, and includes a D-type flip-flop 120, and address counters 121 and 122. A signal WDST, which indicates the beginning of one field of the reproduced digital video signal, is applied to the clear terminal CL of flip-flop 120. Write block signal BLKW and DC voltage V$_{CC}$ are respectively applied to the clocking terminal and D-terminal of flip-flop 120, so that the latter provides an output signal which is "0" at the beginning of each field and becomes "1" at the first rising or leading edge of block signal BLKW. An inverted version WE$_1$ of write enable signal WE$_1$ is applied as a clock signal to counter 121 so that the latter is incremented by the rising edge thereof. The count attained in counter 121 then supplies memory bank 43 with writing address information. Counter 122 is arranged in a fashion similar to that of counter 121 to supply memory bank 44 with writing address information. However, an inverted version WE$_2$ of the write enable signal WE$_2$ for the second memory bank 44 is applied as a clocking signal to address counter 122. Such signal WE$_2$ is delayed behind signal WE$_1$ by one-half cycle of the signal MCC.

When a writing operation is carried out with respect to memory banks 43 and 44, and the data words thus written in are read out therefrom in a reading operation as mentioned previously, the time base of the digital video signal can be compressed or expanded without any difficulty. However, in the operation of a DVTR, there exists near the front edge of reading block signal BLKR a vacant interval where write access is not executed. Such interval must be taken into consideration when constructing the compression or expansion circuit to prevent overwriting during that interval and to prevent the data words from failing to be written, as follows:

A worst-case consideration of the asynchronous reading and writing operation is now discussed with reference to FIGS. 18A and 18J, which respectively show the write block signal BLKW and read block signal BLKR occurring with a timing relation therebetween which is most likely to disrupt the timing of the write intervals W of memory-cycle control signal MCC (FIG. 18H).

In general, the number of data words that are to be converted to parallel form can be represented as the number N. Thus, each cycle of signal MCC will have a width containing N read clock pulses RCK. A first group (group 1) of the digital input signal D$_{IN}$ (FIG. 18B), after having been latched into the serial-to-parallel conversion circuit 51, is transferred to buffer circuit 61 by signal WXFR$_1$, after which write request signal WREQ$_1$ (FIG. 18F) rises to "1". However, if the timing of the rising or leading edge of write request signal WREQ$_1$ is delayed by an amount δ from the timing of the rising edge of signal MCC, or if write request signal WREQ$_1$ occurs at a time when signal MCC is "1" (i.e., during the writing operation), then the writing operation is forced to wait until after the end of the succeeding reading operation. In this worst-case example, the interval of memory control cycle signal MCC corresponding to the next writing phase is close to the time of the rising or leading edge of block signal BLKR and hence signal MCC remains in a reading phase as shown in FIG. 18H. As a result, the waiting time for the data words stored in the latches B$_{11}$-B$_{14}$ of buffer circuit 61 is at a maximum. When this waiting time becomes longer than a theoretical maximum latching time 3NT$_w$ of the serial-to-parallel conversion circuit 51, overwriting will occur and the information in the data words stored in buffer circuit 61 will be lost.

In other words, during the above waiting time, the data words of group 3, for example, which are latched in the serial-to-parallel conversion circuit 51 are not transferred therefrom at the time that the data words of group 5 are applied to conversion circuit 51. Accordingly, in order to prevent such occurrence, the parallel groups of words of group 1 must be written into memory bank 43 at a time before the data words of group 5 arrive at conversion circuit 51.

As shown in FIG. 18H, a point in time P represents the time at which signal MCC would have risen to "1" were it not for the occurrence of the front edge of block signal BLKR, and the interval from the time that the data words are latched into buffer circuit 61 while the write request signal WREQ is "1" until the point of time P, can be expressed as $(N-\delta)T_R$, in terms of the read clock period T$_R$. At the same time, if the waiting time or delay in the writing operation attributable to the re-synchronizing of signal RCC (FIG. 18K) with block signal BLKR (FIG. 18J) is represented in terms of the read clock period T$_R$, such interval is expressed as $\alpha T_R$. The completion of an actual write access corresponds to the falling or trailing edge of memory cycle control signal MCC, so that the time required for a writing operation is $\frac{1}{2}$ NT$_R$.

Accordingly, the occurrence of overwriting, and the resulting loss of data, can be prevented from occurring by selecting N, δ, and α to satisfy the following equation:

$$3NT_W > [(N-\delta)+\alpha+(N/2)]T_R \ldots \quad (1)$$

In this case, if α and δ are each represented as multiples of one clock period, which is considered as a basic unit, and any remaining fraction of a clock period is considered one complete clock period, the minimum of δ is unity, and the maximum value of α is N−1, in the worst case. These values can be substituted into equation (1) to obtain the following relation:

$$T_W > \frac{5N-4}{6N} T_R \quad (2)$$

If the value of N is 4, as in the above described embodiment, the following relation results:

$$T_W > (\tfrac{2}{3})T_R.$$

Accordingly, it is apparent that time base expansion of up to one and one half can be achieved.

In the above example, a two stage latch arrangement, with the serial-to-parallel conversion circuit 51 and the buffer circuit 61 being the two stages, is provided in advance of each memory bank. In general, if an M-stage latch arrangement is provided, equation (1) can be rewritten as follows:

$$(2M - 1) \cdot N \cdot T_W > \left[ (N - \delta) + \alpha + \frac{N}{2} \right] T_R \quad (3)$$

Similarly, the worst values of $\delta$ and $\alpha$ can be substituted into equation (3) to obtain the following relation:

$$T_W > \frac{5N - 4}{2(2M - 1)N} \cdot T_R \quad (4)$$

Although in the above-described embodiment, M was selected as 2, if M is selected as 3, i.e., if a three-latch circuit is provided, and N is selected as 4, the following relationship results:

$$T_W > \tfrac{1}{3} T_R,$$

and a time-base expansion of up to two times can be achieved.

Furthermore, although in the above-described embodiment two memory banks 43 and 44 are used, in general, n memory banks can be used in a time base conversion apparatus. Thus, equations (3) and (4) can be expressed in terms of n memory banks to achieve the following relation:

$$(nM - 1) \cdot N \cdot T_W > \left[ (N - \delta) + \alpha + \frac{N}{2} \right] T_R \quad (5)$$

which in the worst case yields the relation:

$$T_W > \frac{5N - 4}{2(nM - 1)N} T_R \quad (6)$$

Thus, the number of memory banks is selected as n=3, the number of latching stages M=2 and the value N=4, the following relation is obtained:

$$T_W > 2/5 T_R,$$

and accordingly, a time base expansion of up to two-and-one-half times can be achieved.

From the foregoing, it is apparent that no overwriting problem will be encountered whenever $T_W$ is greater than $T_R$, that is, during a time base compression operation. Therefore, if the time base conversion apparatus is properly designed for time base expansion, the same apparatus can be conveniently used for time base compression.

FIG. 19 illustrates another embodiment of time base conversion according to this invention, and includes sequentially-latched series-to-parallel converters 201, 202, 203, and 204. The input data words of input digital signal $D_{IN}$ are provided in parallel form from series-to-parallel converters 201 and 203 to a first memory bank 205 and from series-to-parallel converters 202 and 204 to a second memory bank 206. Each of series-to-parallel converters 201-204 is formed of latch circuits in a form similar to that of the embodiment of FIG. 9. The input data $D_{IN}$ is latched sequentially in the respective converters 201-204 for each N digital data words to form an N-word parallel group, which are respectively written into the memory banks 205 and 206. Thereafter, the N-word parallel groups are read out from memory banks 205 and 206 and are converted back to their original serial form in parallel-to serial converters 207 and 208, respectively, and are applied through multiplexer 209 to provide digital output data signal $D_{OUT}$.

As mentioned hereabove, the timing of the memory operation is determined by a fixed clock which, in the above-described embodiments, is the reading clock RCK, so that the construction of the entire apparatus is greatly simplified.

Furthermore, in the case of a DVTR, since several rotary heads are arranged in line while the heads scan the tape at an angle thereto, the time that each head first engages the tape will be different for each head. However, with the time base conversion apparatus of this invention, if a delay time for each of the respective heads is taken into consideration, compensation for such delay can be simply achieved.

Also, in the illustrated embodiments, two memory banks 43, 44 or 205, 206 are used, but it is apparent that any other number n of memory banks could be used.

In the time base conversion apparatus of this invention, the memory capacity of memory banks 43, 44 or 205, 206 is selected to be sufficient so that the read address does not catch up with the write address, or vice versa, during operation.

It will be further apparent that this invention can be applied to other environments in addition to time base compression and/or expansion of a digital video signal in a DVTR.

Although specific embodiments of the invention have been described in detail herein with reference to the drawings, it will be apparent that the invention is not limited to those precise embodiments, and that various changes and modifications, in addition to those mentioned above, may be effected therein by persons of ordinary skill in the art, without departing from the scope or spirit of the present invention, which is defined in the appended claims.

I claim:

1. A time base converter for changing the time base of an input digital signal comprising:
   a data input terminal;
   digital output means;
   a number n of memory means for storing said input digital signal, and into which said input digital signal is written at a write clock frequency of a write clock and from which the written-in digital signal is read out at a read clock frequency of a read clock, said memory means having a memory cycle with a writing phase and a reading phase in each period thereof and which is based on the timing of said read clock, the write clock frequency and read clock frequency being different from one another, with n being a positive integer;
   a number M of input latching means for each said memory means and coupled in sequence between said data input terminal and the respective memory means for gating a group of words of said input digital signal in parallel form to said respective memory means, each said latching means having a number N of channels, each channel processing a predetermined subgroup of said group of words, with M and N being positive integers;

output latching means coupled to said memory means for receiving the digital signal read out therefrom and providing the same to said digital output means; and control means for providing control signals to said input latching means, said memory means, and said output latching means to control transfer of data thereamong on the basis of said write clock and said read clock;

wherein n, M and N are selected to be sufficient to prevent the loss of said input digital signal in the event that said read clock frequency is lower than said write clock frequency.

2. A time base converter according to claim 1, wherein the write clock frequency has a corresponding period $T_W$, the read clock frequency has a corresponding period $T_R$, and n, M and N are chosen to satisfy the inequality:

$$\frac{5N-4}{2(nM-1) \times N} < \frac{T_W}{T_R}.$$

3. A time base converter according to claim 1, wherein said input digital signal occurs in serial words of a predetermined number of bits; and the number M is at least two with a first one of said input latching means having N sampling latches for sequentially sampling said input digital signal and converting the same to parallel data groups of N words and with at least a second of said input latching means being arranged as a buffer to store said parallel data groups and furnish the same to said memory means.

4. A time base converter according to claim 3, wherein said second of said input latching means includes N latches, each of which is actuated in response to all N sampling latches of said first input latching means having sampled N successive words of said input digital signal.

5. A time base converter according to claim 4, further comprising circuit timing means for providing to said second input latching means a transfer signal to command the transfer of said input digital signal thereto from said first input latching means during the portion of each write phase of said memory cycle following the completion of the sampling of said N successive words by said first input latching means.

6. A time base converter according to claim 1, wherein said memory means includes at least two memory banks, each having a randomly accessable memory with a plurality of addressable storage locations therein, and further comprising at least two write address counters each sequentially addressing the storage locations of a respective one of said memory banks for writing therein the group of words stored in said input latching means.

7. A time base converter according to claim 6, wherein said input digital signal occurs in block units, and each of said write address counters is reset at the onset of each of said block units of said input digital signal.

8. A time base converter according to claim 1, wherein said output latching means includes n sets of N output latches, each set receiving the digital signal read out from a respective memory means, with each of the N output latches of each set being sequentially gated so as to provide an output signal formed of a series of N words with each of said output latches providing one word.

9. A time base converter according to claim 1, wherein there are provided at least a first and second memory means, and at least a first, second, third and fourth input latching means, with each of said first, second, third, and fourth input latching means having N channels, and with each channel processing one of said predetermined subgroups, said input digital signal being sequentially latched in order in said first, second, third and fourth input latching means, said first and third input latching means being coupled to said first memory means, and said second and fourth input latching means being coupled to said second memory means.

10. A circuit for expanding the time base of a digital input signal comprising:

memory means having a recurring memory cycle formed of a read phase and a write phase and into which said digital input signals are written at a write clocking rate during said write phase and from which the written-in signals are thereafter read out at a lower read clocking rate during said read phase;

latch means in advance of said memory means for storing said input digital signal and applying the same in parallel form to said memory means;

read clock means for generating read clock pulses at said read clocking rate;

write clock means for generating write clock pulses at said write clocking rate, said read and write clock pulses being asynchronous with each other;

said digital input signal being written into said memory means and read out therefrom as a block unit, with a read block signal being generated to indicate that one such block unit is in condition to be read out therefrom;

said memory cycle being synchronized with said read clock pulses upon the occurrence of said read block signal so that, if said read block signal occurs during the read phase of said memory cycle, said read phase is repeated and an occurrence of said write phase is omitted; and said memory means including a number n of memory banks, said latch means includes a number M of latching stages for each said memory bank coupled in sequence in advance of the respective memory bank, each latching stage having a number N of channels, each said channel processing a predetermined subgroup of a group of words; with n, M and N being positive integers selected to be sufficient to prevent said input digital signal from overwriting in said latch means.

11. A circuit according to claim 10, wherein said write clock frequency has a corresponding period $T_W$, the read clock frequency has a corresponding period $T_R$, and n, M and N are chosen to satisfy the inequality:

$$\frac{5N-4}{2(nM-1) \times N} < \frac{T_W}{T_R}.$$

* * * * *